Oct. 29, 1963 D. STANIMIROVITCH 3,108,909
MINIATURE STORAGE CELLS AND THEIR PROCESS OF MANUFACTURE
Filed March 31, 1961 3 Sheets-Sheet 1

INVENTOR
DOUCHAN STANIMIROVITCH
BY
ATTORNE

Oct. 29, 1963 D. STANIMIROVITCH 3,108,909
MINIATURE STORAGE CELLS AND THEIR PROCESS OF MANUFACTURE
Filed March 31, 1961 3 Sheets-Sheet 2

INVENTOR
DOUCHAN STANIMIROVITCH
BY
Kenyon & Kenyon
ATTORNEY

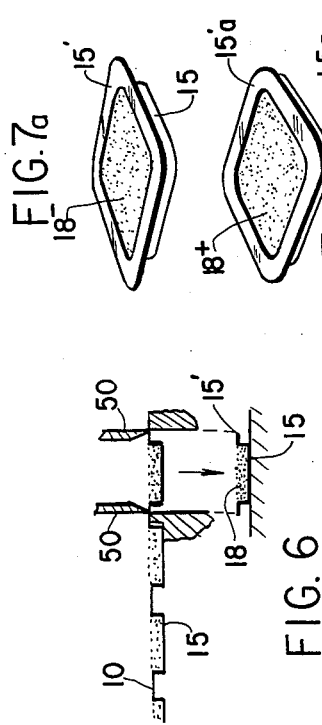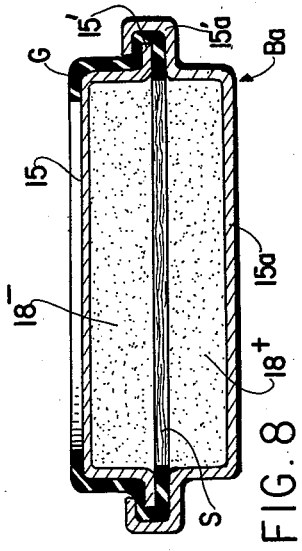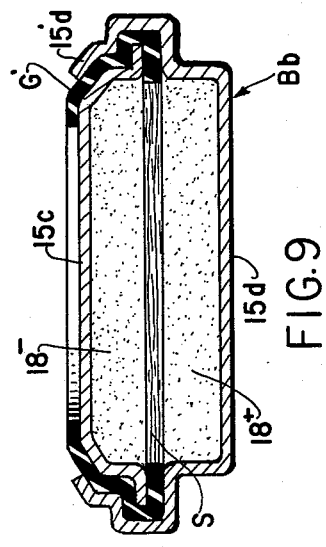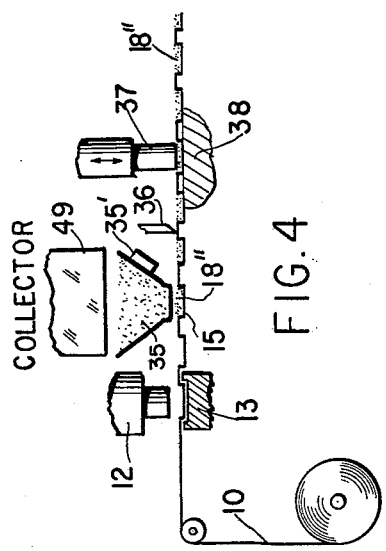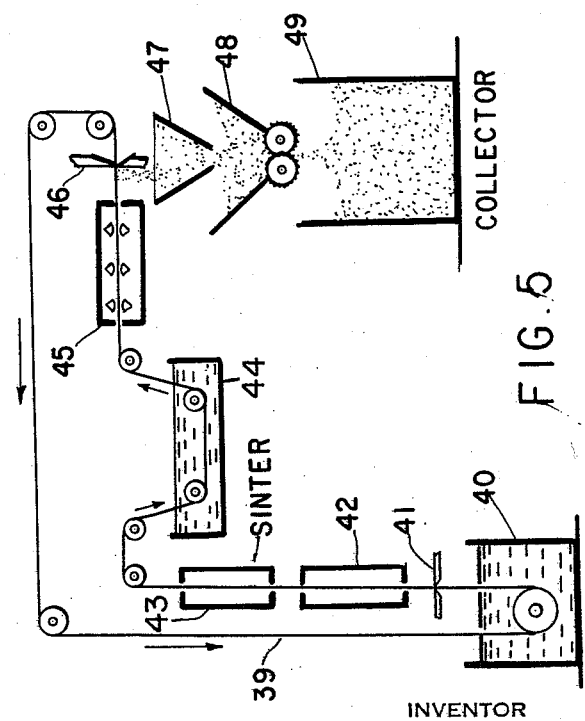

United States Patent Office 3,108,909
Patented Oct. 29, 1963

3,108,909
MINIATURE STORAGE CELLS AND THEIR
PROCESS OF MANUFACTURE
Douchan Stanimirovitch, Paris, France, assignor to Societe
des Accumulateurs Fixes et de Traction (Societe
Anonyme), Romainville, France, a company of France
Filed Mar. 31, 1961, Ser. No. 99,796
15 Claims. (Cl. 136—6)

The present invention relates to manufacturing processes for small-size gas-tight alkaline storage cells of the so-called "button" type, and to the resulting cells and batteries.

Such button cells are generally characterized by their envelope which is made of two metallic cups, each of the cups being respectively in electrical contact with different ones of the electrodes. Said cups are separated by an insulating gasket which, at the same time, ensures the gas tightness of the cell. It is possible with this arrangement where each cup is used as a positive or negative terminal to pile up the cells in order to obtain batteries of any desired voltage.

Until now, the manufacture of said cells comprised the forming of the cups which were then filled one by one with the electro-chemical components. This operation was lengthy and it was relatively difficult to make it automatic. Moreover, the separate, thin sintered electrode plates generally inserted in the button cells were not always in good electrical contact with the cups due to the eventual warping of the thin plates on the one hand, and of the thin sheets of which the cups were made, on the other hand. Furthermore, oxidation occurred on the inner walls of the cups which deteriorated the electrical contact between them and the electrode plate inserts. In order to remedy these drawbacks, it had been proposed as, for example, in U.S. Patent No. 2,971,999 to use flexed contact pieces in the assembly which ensured pressing of the cell components together and against the cell cups. Such a contact piece, although serving its purpose well enough, was a complicating addition in the manufacturing of the cells and increased their cost. Moreover, it, too, was liable to be oxidized.

Principal objects and features of the present invention are the provision of simple manufacturing processes for the button-type cells, such processes being easy to render automatic, and cheap because a great number of cells may be manufactured at the same time and require only a small number of operations. Furthermore, with the processes which will be described, a good contact is always ensured between the electrical components of the cells and the cups and it is not necessary to provide additional contact pieces. The cell components are therefore reduced to their minimum number.

The processes according to the invention are more especially characterized in that they comprise using a band, strip or sheet of stainless steel, nickel-plated steel, nickel or similar metallic material, in passing the said band or sheet through machine forming tools or a stamping machine so that impressions or stamps are shaped in the said band or sheet, said impressions or stamps corresponding to the cups which are to be formed, without, however, severing them from the said band, then in filling the said cups by any suitable physical and/or chemical means with active materials preferably containing a conductive material, and lastly in severing the said cups from the band.

According to another feature of the invention, the unseparated cups in the band are filled with a suitable mass of electrode forming metal powder, and then the whole is then passed through a sintering oven.

According to a further feature of the invention, the filling mass comprises a mixture of active materials and a conductive material, in the compressed state, the conductive material being preferably, but not compulsorily, nickel powder.

According to still another feature of the invention the sintered carrier filling mass inserted into and adhering to the cups is subsequently impregnated with active materials by electrochemical or chemical processes.

According to still another feature of the invention, the filling mass is inserted into and compressed in the cups to cause them to adhere in the latter and this mass comprises a sintered material, impregnated with active material, comminuted to the desired grain size by a previous operation.

Other objects and features of the invention will become apparent from the following specification and the accompanying drawings, wherein:

FIGURES 1, 1a and 1b are diagrammatic illustrations of different types of first stage steps in the preparation of the cell components;

FIGURE 4 is a diagrammatic showing of an alternative mode of preparation of electrode components utilizing the electrode ingredients prepared by the mode of FIGURE 5;

FIGURE 5 is a diagrammatic showing of a different mode of preparation of electrode ingredients;

FIGURE 6 is a diagrammatic view of the severing step for separating individual filled cups from the band thereof;

FIGURE 7 is a perspective view of a cell component containing positive active material filling and embodying the invention;

FIGURE 7a is a similar perspective view of a cell component containing negative active filling material and embodying the invention;

FIGURE 8 is a sectional view of a completed cell prepared according to this invention, and FIGURE 9 is a similar sectional view of a modified form of cell embodying the invention.

Figure 1:
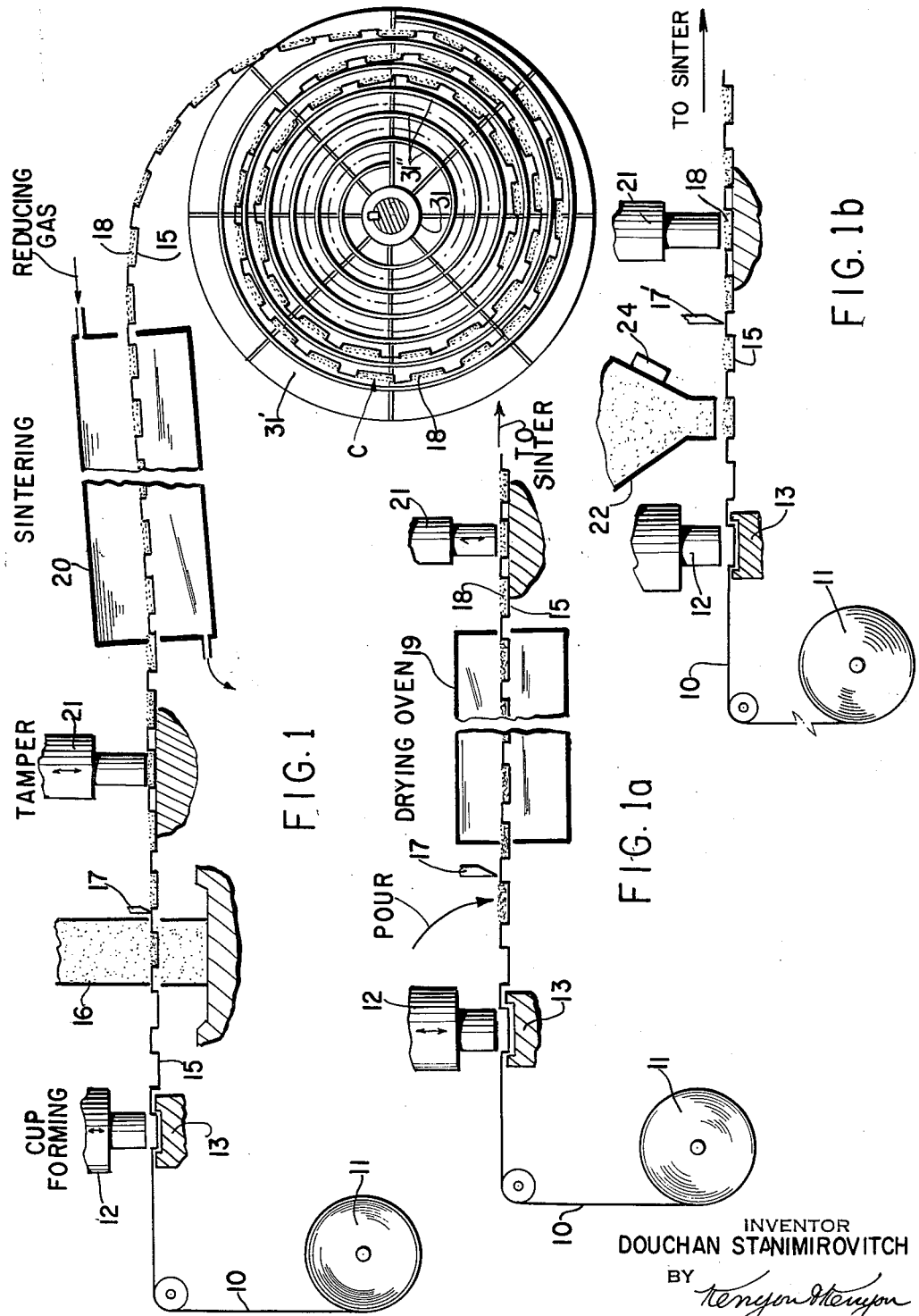

Referring to the drawings, and first to FIGURE 1, a band, strip or sheet 10 of stainless steel, nickel-plated steel, nickel or similar metallic material, is drawn from a coil 11 thereof, and passed through pairs of forming dies 12, 13, disposed relative to a selected width of band which operate to form or stamp successive spaced-apart cup-like depressions 15 in the band 10 across its width, without, however, separating the formed cups 15 from the band 10.

As will be hereinafter set forth in detail, several different procedures may be used from the moment when the cups 15 have been stamped into or formed in the metal band 10. Several such procedures will be described, but it is evident that these descriptions are not limitative in character.

When the cups 15 are formed or stamped in the sheet or band 10, they are not separated from it. These cups 15 in the band then are filled with electrode-forming material by any known process. For example, the openings of the cups 15 being turned upwards, the cup-bearing portion of the band strip or sheet 10 may be passed through a container 16 having therein uncompressed nickel powder of relatively low density for filling of the cups 15 with such powder. This filling may be also effected as illustrated in FIG. 1a, by directly pouring a nickel-powder suspension in a carboxymethyl-cellulose solution into the cups 15. Upon emerging from the powder in container 16 or after pouring of the suspension into the cups 15, the upper band surface is wiped as by a rubber doctor blade 17 so that the nickel powder or suspension fillings 18 are made to lie substantially level with the cup rims. If a suspension is used, the band 10 containing the filled cups 15 is then passed (FIG. 1a) through a drying oven 19. In either event, the band with filled cups is then passed through a sintering oven 20. The latter is preferably slightly aslant in order to promote the circulation of conventional reducing gases (e.g. hydrogen or the like) which are provided as the atmosphere of the sintering oven 20. Prior to sintering, the fillings 18 in successive cups may be compressed or tamped into the cups 15 to any desired extent as by passage of the successive filled cups between tamping plunger means 21. If desired, pore forming material such as carbon particles may be included in the nickel powder or in the suspension which is poured into the cups 15. These carbon particles are consumed by combustion in the sintering operation in oven 20, leaving gaps or pore voids in the sintered fillings 18 lying in the cups 15.

Figure 3:
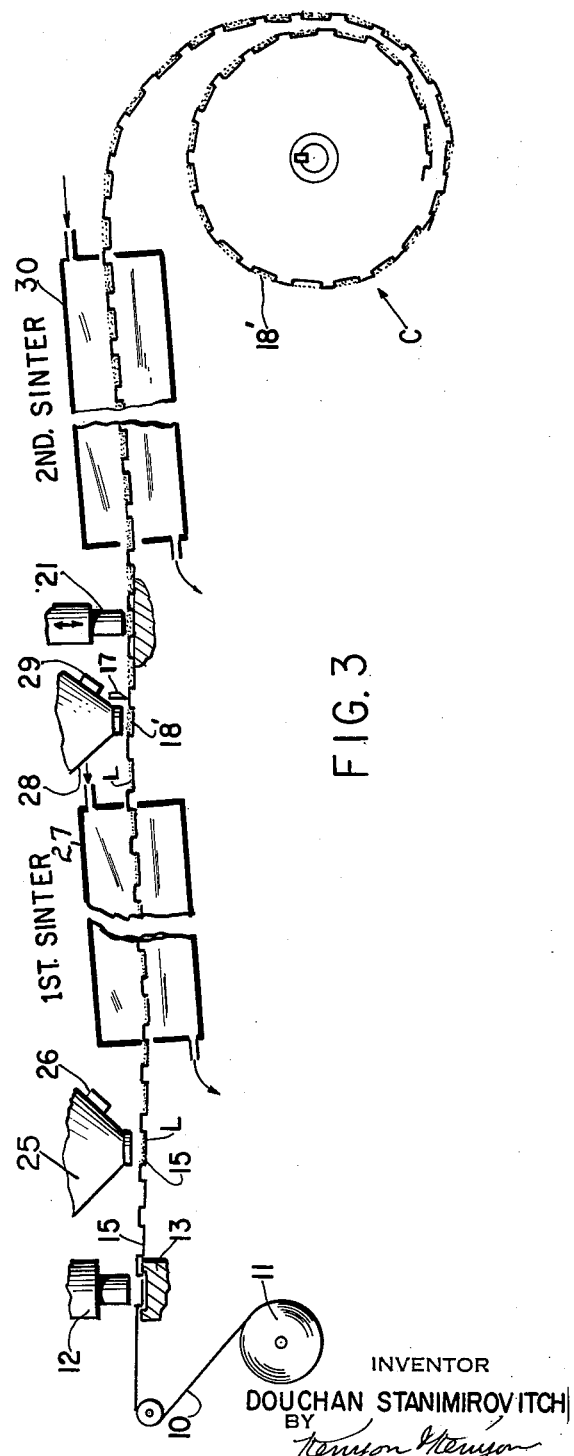
FIGURE 3 is a diagrammatic showing of an alternate type of first stage of such preparation.

In a different and preferred embodiment as is illustrated in FIGURE 1b, the stamped band 10 may have its cups 15 successively passed under a hopper 22 which meters out, for example, carbonyl-nickel powder or other suitable metallic powder, to fill the successive cups 15 with filling 18. The hopper 22 is provided preferably with a vibratory device 24 which is advantageous in facilitating deposit of the powder filling into the cups 15. A rod or doctor blade 17′ levels the powder filling 18 filled into the cups 15 to a suitable level, preferably even with the cup rims and the band is then passed preferably between tamping means 21 and then into a sintering oven, like oven 20. When carbonyl nickel powder or other suitable metallic powder filling is used, it may be advantageous first to deposit a thin powder layer L in the cups 15 as is illustrated in FIG. 3. This layer L serves to promote the adhesion to the cups of the balance of the powder filling mass thereafter added to the cups 15, as described in the French Patent No. 1,000,836 as an example.

In such event, as seen in FIGURE 3, a very thin layer L of nickel powder is first deposited in the bottoms of the cups 15, as from a hopper 25 provided advantageously with a vibrating device 26. Then the band bearing cups filled with layer L is passed through a high temperature sintering oven 27 which contains a conventional reducing atmosphere. The layer bearing cups 15 of the band are then passed under a second hopper 28 also advantageously provided with a vibrator 29 which serves to completely fill the cups 15 successively with nickel powder fillings 18′ over their sintered layers L previously applied as has been described. The doctor blade 17 then levels the filling 18′ even with the cup rims and the filled cups of the band then go to a sintering oven 30. As hereinabove mentioned, the sintering ovens 27 and 30 are preferably aslant and are filled with a conventional reducing gas atmosphere. The deposit first of the thin sintered layer L promotes the adhesion of the sintered nickel filling layer 18′ to the cups 15.

In either of the latter two embodiments which have been described, it is possible and preferable to compress slightly the nickel layers 18 or 18′ in the cups 15 as by the tamping plungers 21 before passing the band and filled cups 15 into the respective sintering ovens 20 or 30 according to the desired porosity of the sintered fillings 18 or 18′ in these cups 15. The tamping should leave the fillings substantially level with the cup rims.

In preparing the powder filling masses, spacing bodies, e.g. carbon particles for pore forming purposes may be added to the nickel powder masses or to the nickel powder suspension. These particles are destroyed by combustion during the sintering operations, leaving pore-forming voids in the fillings 18 or 18′.

Any other suitable process may, of course, be used for filling the cups 15 with an adhering sintered nickel filling 18 or 18′ without departing the scope of the invention.

After the fillings 18 or 18′ have been sintered into the unseparated cups 15, impregnation of the sintered nickel fillings 18 or 18′ in these cups 15 with positive or negative active materials is effected. For this purpose, the band containing the still unseparated filled cups is passed through a conventional solution of a nickel salt, e.g. nitrate or sulfate containing, if desired, a cobalt salt, e.g. nitrate, sulfate, etc. if positive active materials are to be impregnated or of a cadmium salt solution, e.g. nitrate, sulfate, etc. if negative active materials are to be impregnated into the sintered fillings of the selected solution depending upon the desired polarity of the sintered active materials. These impregnating solutions are conventional. The band with its cup fillings thus impregnated with the selected solutions is then passed through a sodium hydroxide solution in which preferably cathodic polarization is effected in conventional manner during the precipitation of the corresponding hydroxide. This polarization measure ensures a better distribution of the active materials in the sintered cup filling masses 18 or 18′. The impregnating steps just described may be repeated as many times as is necessary for obtaining a suitable degree of impregnation of the sintered cup filling masses 18 or 18′ with the active materials. The band and cups leaving the latter solution are then washed and dried.

Figure 2:
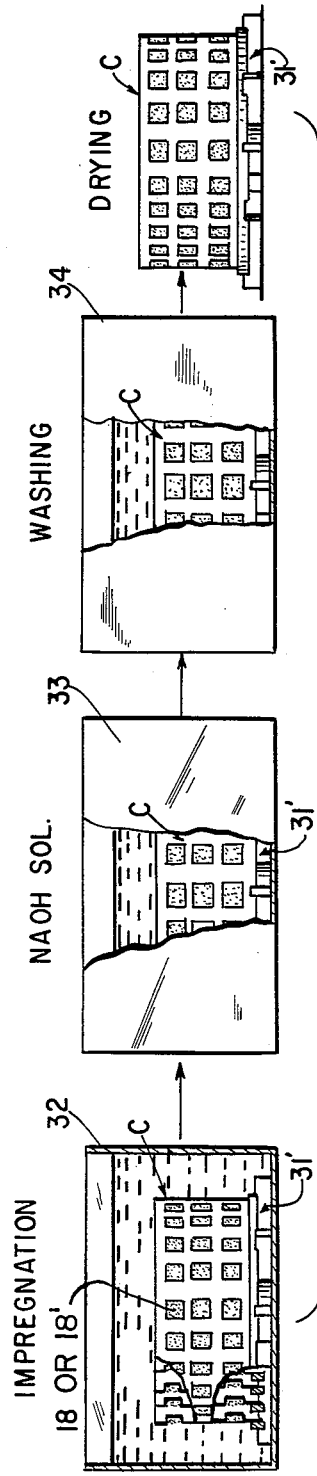
FIGURE 2 is a diagrammatic showing of a successive stage in such preparation.

Here, it may be noted that the impregnation just described may be executed directly on the band and its filled cups 15 as it progresses beyond the previously described sintering steps. But it may be advantageous, in order to gain space, to wind the bands 10 having the unseparated cups 15 filled with impregnated sintered nickel masses 18 or 18′ around rolls 31 having at least one end guide plate 31′ having spiral grooves 31″ which enmesh a side edge of the bands to form coils C (FIGURES 1 and 3). The spirals 31″ of the grooved guide plate 31′ are spaced to maintain gaps between the coil turns and prevent their contact with each other. These wound coils C as illustrated in FIG. 2 are then treated by dipping successively in the anodic or cathodic impregnating solutions aforementioned as the case may be in a first tank 32, then in a sodium hydroxide solution containing tank 33 in which, if desired, conventional cathodic polarization may also be effected and finally in washing tank 34 with subsequent air or oven drying. The said bands with these impregnated cup fillings 18 or 18′ are therefore processed exactly like the carrier bands of sintered nickel conventionally used in making thin plate storage batteries.

It is also possible to operate in the following manner for impregnating the fillings of the button cups: the band of unseparated cups 15 bearing the sintered nickel carrier fillings 18 or 18′ either as a coil or in band form is cathodically polarized in a nickel or cadmium salt (preferably nitrate) solution, said solutions being maintained at a low pH as described, for example, in French Patent 828,247 of Feb. 7, 1938. In this way, hydroxides precipitate in the pores of the sintered spongy fillings 18 or 18′ and the acidity of the solutions prevents the hydroxides from precipitation outside the sintered carrier fillings 18 or 18′.

It is well understood that any other impregnation process giving good results may be used in impregnating the cup fillings 18 or 18′ without departing from the scope of the invention.

After the impregnation, the conventional electro-chemical purification of the impregnated active materials in the fillings 18 or 18′ may be executed, such operation serving to drive out the anions of the salts used for the impregnation which may remain in the active filling materials, even after a lengthy washing. Such operation may be effected on the band bearing the impregnated cups while either in coiled or uncoiled condition by subjecting them to a number of charges and discharges, the band being opposed to counter-electrodes in an alkaline electrolytic bath as is conventional in the treatment of sintered plate electrodes. Such purification steps may be executed either continuously or by batch. This last operation is terminated by further washing and drying.

It is also possible to prepare the fillings and insert them into the cups in a different manner.

Instead of filling the cups with a mass of nickel powder which is then sintered and impregnated with active materials, the cups 15 are filled with a filling mass comprising sintered nickel powder already impregnated with active materials. The arrangement of FIG. 4 may be used. Such a powdered filling mass 18″ may be distributed by the hopper 35 under which the unseparated cups 15 of the band 10 pass. Here again, the hopper 35 is advantageously provided with a vibratory device 35′. The band bearing filled cup 15 is then passed under the doctor rod 36 which gives a suitable level to the powder, then under tamping plungers 37 and 38 which suitably compress the said powder fillings 18″. The leveling and tamping are executed in such a way that the cups 15 are filled up to their rims with the compressed active mixture 18″.

The powder of sintered nickel impregnated with active materials for introduction via hopper 35 to provide the fillings 18″ introduced into the cups 15 of band 10 may be obtained as shown diagrammatically in FIGURE 5. A nickel plated steel sheet 39 (FIGURE 5) of small width and relatively large thickness (e.g. 1 cm. wide and 0.5 mm. thick) is coated on both faces with a carbonyl nickel suspension in a carboxymethyl-cellulose solution in a tank 40. The band bearing these coatings passes a doctor 41 and is dried in a dryer 42 and then sintered in an oven 43 maintained under a reducing atmosphere. The sheet 39 thus coated on both sides with thin sintered nickel layers is then passed through an impregnating apparatus 44 which impregnates the sintered layer with the desired positive or negative active materials in conventional manner. On leaving the said apparatus it is passed through a drier 45 and then through a draw-plate 46 whose cross-section is only very slightly larger than the cross-section of the nickel plated steel sheet 39. This draw plate 46 tears off and crumbles the impregnated sintered nickel layers from both faces of the sheet or band 39. These stripped-off crumbled layers fall into a hopper 47.

The apparatus may be disposed in such a way that the band 39 after being laid bare by the draw-plate 46, is again passed through the coating tank 40 containing the carbonyl nickel suspension, and thus immediately begins another cycle, the band 39 being endless.

The impregnated sintered nickel stripped from band 39 may be either used such as it is as it drops into hopper 47 from the band passing through the draw-plate 46, or preferably it falls from hopper 47 into a grinder 48 wherein it is comminuted in smaller particles or grains of desired size before being caught in a collector 49 and delivered to the hopper 35 (FIGURE 4) which pours it on the cups 15 on band 10.

The active material-impregnated sintered nickel powder fed to hopper 35 may also be derived from waste products of the manufacture of conventional sintered electrode plates which are ground up after the conventional carrier sheet or screen has been eliminated from them.

With any of the described processes for filling the cups 15 in the band, the result is a band of cups 15 filled to their rims either with a sintered nickel layer 18 or 18′ impregnated with active materials, or with a compressed layer 18″ of sintered nickel containing active material which are adherent to the cups. A band 10 containing such filled cups 15 is then fed to a severing die 50, FIGURE 6, and the individual cups 15 are finally severed therefrom. Each of the cups 15 which is then cut off, has a flange 15′ of a small width to allow for the crimping together of the two cups containing fillings of opposite polarities after assembly as with an insulation and tightness ring between the said cups and with a suitable separator and electrolyte added as will be described.

The individual cups 15 and 15a (FIGURES 7 and 7a) severed from the bands of filled cups 15 and containing respectively fillings $18^-$ and $18^+$ of negative and positive materials are assembled into button type cells in conventional ways. For example, each filling $18^-$ and $18^+$ is wetted to a desired extent with suitable electrolyte, for example, potassium hydroxide and a separator sheet S, for example, of the type described in U.S. Patents 2,971,-999; or 2,930,829, or in French applications 851,077 and 851,078, both filed January 27, 1961, wetted with the electrolyte is interposed between adjacent outer surfaces of the two fillings $18^-$ and $18^+$. An insulation member and sealing gasket G is applied to one of the cups, for example, 15, so that it covers its flange 15′ as well as its outer side surface and lower lip portion to prevent any electrical contact between any metallic parts of the two cups. The flange 15′a of the cup 15a is then crimped tightly around the flange 15′ of the cup 15 to form with gasket G an hermetically sealed joint between the two cups thus completing the cell $B_a$.

In the cell $B_b$ as shown in FIG. 9 also assembled from cell components 15c and 15d containing fillings $18^-$ and $18^+$, the flange 15′d of one of the cups is sufficiently larger in dimensions so that its crimping after assembly permits it to be turned down into clamping engagement with the somewhat tapered bottom of the other cup 15c, the gasket G′ in such instance underlying all portions of crimped flange 15′d and insulating it from the cup 15c as well as providing an hermetic seal. The crimped flange 15′d in this embodiment increases the sealing features in the manner described in U.S. Patent No. 2,843,650, it being important that the seals effected in crimping be absolutely gas tight to prevent loss of gas and electrolyte during use of the cells.

Groups of cells $B_a$ or $B_b$ can be piled up to make a battery of desired voltage.

As can be seen, the invention relates to a simplified manufacturing procedure which essentially uses a continuous carrier such as metal band in which are formed the cups and of conducting all the subsequent operations with the said cup bearing band which progresses through the various mechanisms required for obtaining the positive and negative cup parts of the cells until the said parts are completely formed and finally severed from the band. It only remains then to add a suitable amount of electrolyte to assemblies of appropriate cups and to unite them according to known arrangements after inserting a separator between the assembled cup parts.

The pairs of forming dies 12 and 13 which form several adjacent cups 15 across the width of the band, in the embodiment shown, produce cups which in plan are square-shaped. They could equally be shaped to produce cups that in plan are round, oval, rectangular or any other desired shape.

It is well understood that variations of the invention within the scope of the appended claims are possible and are contemplated. There is no intention of limitation to the exact details shown and described.

What is claimed is:

1. That improvement in the manufacture of alkaline electric storage cells of the so-called button type, comprising providing bands of metallic material, forming successive cups in the bands, filling formed cups of one band with positive electrode forming material, sintering the positive filling material to the cups to anchor it thereto filling cups of another band with negative electrode forming material, sintering the negative electrode forming material to the cups with which it has been filled to anchor it thereto, thereafter severing individual filled cups from the bands, and thereafter assembling individual cups filled with positive electrode material with individual cups filled with negative electrode material, interposing separators between the electrode materials of differing polarity of the assembled cups, adding electrolyte to the assembly, insulating the assembled cups from each other and uniting the assembled cups with an hermetical seal.

2. That improvement in the manufacture of alkaline electric storage cells of the so-called button type comprising providing bands of metallic material, forming successive cups in the bands without separation of the formed cups from the bands, filling formed cups of one band with positive electrode forming material and filling formed cups of another band with negative electrode forming material, sintering the respective positive and negative electrode materials to the cups with which they have been filled to anchor it thereto, thereafter severing the cups from the bands with flanges at their rims, thereafter assembling individual flanged cups filled with positive electrode material with individual flanged cups filled with negative electrode material, interposing separators between the electrode materials of differing polarities of the assembled cups, adding electrolyte to the assemblies, insulating the assembled flanged cups from each other and uniting the assembled flanged cups by crimping the flanges of one over the other to form an hermetically sealed joint between them.

3. That improvement in the manufacture of electric storage cells of the so-called button type comprising the steps of providing a band of metallic material, forming successive cups into the band without separation therefrom, filling the unseparated cups with metallic powder, sintering the powder filling in the filled unseparated cups to bond the fillings to the latter, then impregnating the sintered fillings in the unseparated cups in the band with active electrode materials and thereafter severing the individual filled cups from the band.

4. That improvement in the manufacture of electric storage cells of the so-called button type comprising the steps of providing a band of metallic material, forming successive cups in the band without separation therefrom, filling the cups in the band with a metallic powder suspension, drying the filling in the unseparated cups, then sintering the fillings in the unseparated cups to bond the fillings to the cups, then impregnating the sintered fillings in the unseparated cups with active electrode materials and thereafter severing the individual filled cups from the band.

5. That improvement in the manufacture of electric storage cells of the so-called button type comprising the steps of providing a band of metallic material, forming successive cups in the band without separation therefrom, applying a layer of metallic powder to the inner bases of the cups in the band, sintering the applied layers to bond them to said bases, then filling the layer bearing unseparated cups with a metallic powder, then sintering the powder fillings in the unseparated cups to bond them to the sintered layers therein, thereafter impregnating the sintered fillings in the unseparated cups with active electrode materials and thereafter severing the individual filled cups from the band.

6. That improvement in the manufacture of electric storage cells of the so-called button type comprising the steps of providing a band of metallic material, coating the band with layers of conductive metallic powder in suspension, drying the coating layers on the band, sintering the dried coating layers on the band, impregnating the sintered coating layers with electrode active materials, drying the impregnated coated layers on the band, scraping the coated layers from the band to provide particulate material, providing another band of metallic material, forming successive cups in the latter band without separation therefrom, filling the unseparated cups with the particulate material, compressing the fillings of particulate material in the cups to anchor them in the cups and effect selected porosity thereof and thereafter severing individual filled cups from said second band.

7. That improvement in the manufacture of electric storage cells of the so-called button type comprising the steps of providing a band of metallic material, coating the band with layers of conductive metallic powder in suspension, drying the coating layers on the band, sintering the dried coating layers on the band, impregnating the sintered coating layers with electrode active materials, drying the impregnated coated layers on the band, scraping the coated layers from the band to provide particulate material, comminuting the particulate material to selected grain size, providing another band of metallic material, forming successive cups in the latter band without separation therefrom, filling the unseparated cups with the comminuted particulate material, compressing the fillings of comminuted particulate material in the cups to anchor them in the cups and effect selected porosity thereof and thereafter severing individual filled cups from said second band.

8. That improvement in the manufacture of electric storage cells of the so-called button type comprising the steps of providing a band of metallic material, forming successive cups in the band without separation therefrom, filling the unseparated cups with metallic powder and port forming material, sintering the fillings in the unseparated cups to bond the fillings thereto and eliminate the pore forming material by combustion thereof, impregnating the sintered fillings in the unseparated cups with active electrode materials and thereafter separating the filled cups from the band.

9. That improvement in the manufacture of electric storage cells of the so-called button type comprising the steps of providing a band of metallic material, forming successive cups in the band without separation therefrom, filling the unseparated cups with a liquid suspension of metallic powder and pore forming material, drying the fillings in the unseparated cups, sintering the dried fillings in the unseparated cups to bond them to the cups and eliminate the pore forming material therefrom by combustion, impregnating the sintered fillings in the unseparated cups with active electrode materials and thereafter separating the filled cups from the band.

10. That improvement in the manufacture of electric storage cells of the so-called button type comprising the steps of providing a band of metallic material, forming successive cups in the band without separation therefrom, filling the unseparated cups with metallic powder, sintering the fillings in the unseparated cups to bond them to the cups, winding the filled unseparated cups and band to form a roll, impregnating the filled cups in the roll with active electrode materials and thereafter separating the cups with impregnated fillings from the band in the roll.

11. That improvement in the manufacture of electric storage cells of the so-called button type comprising the steps of providing a band of metallic material, forming successive cups in the band without separation therefrom, filling the unseparated cups with metallic powder, sintering the fillings in the unseparated cups to bond them to the cups, passing the unseparated cups with sintered fillings into a metallic salt solution of the desired electrochemically active material in an initial stage of impregnation, then through an alkali hydroxide solution while effecting cathodic polarization therein to complete the impregnation of the sintered fillings with active electrode material and thereafter severing the filled cups from the band.

12. That improvement in the manufacture of electric storage cells of the so-called button type comprising the steps of providing a band of metallic material, forming successive cups in the band without separation therefrom, filling the unseparated cups with metallic powder, sintering the filling in the unseparated cups to bond them to the cups, winding the unseparated cups with sintered fillings and the band into a roll, passing the roll of unseparated cups with sintered fillings into a metallic salt solution of the desired electrochemically active material in an initial stage of impregnation, then through an alkali hydroxide solution while effecting cathodic polarization therein to complete the impregnation of the sintered fillings with active electrode material and thereafter severing the filled cups from the band in the roll.

13. That improvement in the manufacture of electric storage cells of the so-called button type comprising the steps of providing a band of metallic material, forming successive cups in the band without separation therefrom, filling the unseparated cups with metallic powder, sintering the fillings in the unseparated cups to bond them to the cups, passing the unseparated cups with sintered fillings into a metallic salt solution of the desired electrochemically active material, said solution being maintained at an acid pH and effecting cathodic polarization of the fillings in said solution to impregnate them with the active electrode material, and thereafter severing the cups with impregnated fillings from the band.

14. An alkaline electric storage cell of the so-called button type comprising a pair of cups each having a flange, each cup being filled with sintered metallic powder bonded to the cups and impregnated with active electrode material of requisite polarity, insulating material between the cups, a separator between the fillings, and electrolyte in the cell, said cups being united by crimping of the flange of one of the cups over the flange of the other with the insulating material lying between the flanges and forming an hermetic seal therewith.

15. A battery comprising a pile of the cells of claim 14 superimposed on each other.

References Cited in the file of this patent

UNITED STATES PATENTS

| | | |
|---|---|---|
| 2,681,375 | Vogt | June 15, 1954 |
| 2,697,737 | Goldberg et al. | Dec. 21, 1954 |
| 2,877,285 | Kempf | Mar. 10, 1959 |
| 2,942,054 | Jeannin | June 21, 1960 |
| 2,987,569 | Lang | June 6, 1961 |